United States Patent

Kato et al.

[11] Patent Number: 5,250,609
[45] Date of Patent: Oct. 5, 1993

[54] AQUEOUS COATING COMPOSITION

[75] Inventors: Minoru Kato; Osamu Kikuchi; Kyoko Kadoya; Teruo Hiraharu, all of Yokkaichi, Japan

[73] Assignee: Japan Synthetic Rubber Co., Ltd., Tokyo, Japan

[21] Appl. No.: 866,553

[22] Filed: Apr. 10, 1992

[30] Foreign Application Priority Data

Apr. 10, 1991 [JP] Japan ................... 3-104651

[51] Int. Cl.$^5$ .................. C08L 25/06; C08L 31/02
[52] U.S. Cl. ................... 524/560; 524/561; 526/318.44
[58] Field of Search ............. 526/318.44; 524/560, 524/561

[56] References Cited

U.S. PATENT DOCUMENTS

| | | | |
|---|---|---|---|
| 3,326,836 | 6/1967 | Snyder et al. | 524/560 |
| 3,950,294 | 4/1976 | Connelly et al. | 524/560 |
| 4,016,127 | 4/1977 | Larsson et al. | 526/318.44 |
| 4,312,914 | 1/1982 | Guth | 524/560 |
| 4,492,780 | 1/1985 | Zimmerschied et al. | 524/560 |
| 4,517,330 | 5/1985 | Zdanowski et al. | 524/408 |

FOREIGN PATENT DOCUMENTS 63-286471 11/1988 Japan.

*Primary Examiner*—Paul R. Michl
*Assistant Examiner*—Olga Asinovsky
*Attorney, Agent, or Firm*—Oblon, Spivak, McClelland, Maier & Neustadt

[57] ABSTRACT

An aqueous coating composition comprising 15 to 40% (as a solid) by weight of an aqueous copolymer latex. The aqueous copolymer latex is prepared by the emulsion polymerization of monomer components which comprises: (A) 10 to 70 parts by weight of a (meth)acrylate monomer comprising (A-1) 20 to 80% by weight of a branched $C_{3-5}$-alkyl (meth)acrylate and (A-2) 80 to 20% by weight of a linear $C_{2-4}$-alkyl (meth)acrylate; (B) 5 to 30 parts by weight of an ethylenically unsaturated carboxylic acid; and (C) 0 to 85 parts by weight of a monomer copolymerizable with said components (A) and (B). The composition exhibits strong resistance to neutralization, excellent durability, a superior leveling characteristic, superb adhesiveness, high resistance to water-permeation, and good water repellency. It is suitable for coating plastics, ceramics, woods, and formed concrete.

8 Claims, No Drawings

AQUEOUS COATING COMPOSITION

BACKGROUND OF THE INVENTION

Field of the Invention

The present invention relates to an aqueous coating composition which has high resistance to neutralization and excellent glossiness and durability.

Description of the Background Art

Cement products used in civil and architectural fields such as, for example, cement-concrete, cement mortar, ALC plates, PC plates, and the like, are neutralized due to the influence of environmental variations, such as a rise in the concentration of carbon dioxide or sulfur dioxide, acidic rain, or the like, thus remarkably accelerating their deterioration. This phenomenon raises a serious concern to the society.

Molding and curing cement products by blending a synthetic rubber latex or natural latex with cement has been studied and practiced. However, blending latexes with all cement materials of construction is economically difficult and blending latex is not necessarily effective on the inhibition of the neutralization of the cement products.

A method of preventing cement concrete from being deteriorated by coating the surface of the cement concrete with a water repellent material such as silicone has been proposed and put into practice. Long-lasting resistance to neutralization, however, cannot be obtained by this method, because the coating material only penetrates into an extremely shallow layer of the porous cement concrete.

Furthermore, applying a paint over the surface of cement concrete has been known to prevent its deterioration and improve its esthetic appearance. However, paints cannot prevent cement concrete from being neutralized.

There are also demands for coating materials to be applied to floors of buildings to effectively protect the flooring materials such as cement, plastics, ceramics, woods, and the like, providing excellent glossiness of the surfaces without frequent maintenance and cleaning services. Such coating materials must be adaptable to man power savings in the building maintenance works to cope with recent man-power deficiency. Conventional aqueous type floor coating compositions are not sufficient in providing good resistances against black heel marks and scuffing on floors, requiring frequent cleaning of the floors to maintain their beautiful appearance.

SUMMARY OF THE INVENTION

The present invention is therefore to provide, with due consideration to the above problems in conventional coating compositions for cement and other materials, an aqueous coating composition which has high resistance to neutralization, and excellent penetrability, adhesiveness, weatherability, water-resistance, water-repellency, and resistance to water-permeation, and which is suitable for coating not only molded cement products but also plastics, ceramics, woods, and the like.

Accordingly, an object of this invention is to provide an aqueous coating composition comprising 15 to 40% (as a solid) by weight of an aqueous copolymer latex prepared by emulsion polymerization of monomer components which comprises:

(A) 10 to 70 parts by weight of a (meth)acrylate monomer, comprising (A-1) 20 to 80% by weight of a branched alkyl (meth)acrylate, with the alkyl group having 3–5 carbon atoms, and (A-2) 80 to 20% by weight of a linear alkyl (meth)acrylate, with the alkyl group having 2–4 carbon atoms;

(B) 5 to 30 parts by weight of an ethylenically unsaturated carboxylic acid; and (C) 0 to 85% by weight of a monomer copolymerizable with said components (A) and (B).

Other objects, features and advantages of the invention will hereinafter become more readily apparent from the following description.

DETAILED DESCRIPTION OF THE INVENTION AND PREFERRED EMBODIMENTS

Given as examples of branched alkyl (meth)acrylate with a $C_{3-5}$ alkyl group, which is component (A-1) of the present invention, are isopropyl (meth)acrylate, isobutyl (meth)acrylate, tert-butyl (meth)acrylate, isoamyl (meth)acrylate, and tert-amyl (meth)acrylate. Of these, preferable (meth)acrylates are isobutyl (meth)acrylate and tert-butyl (meth)acrylate. These (meth)acrylates may be used either independently or in combination of two or more of them.

Given as examples of linear alkyl (meth)acrylate with a $C_{2-4}$ alkyl group, which is component (A-2) of the present invention, are ethyl (meth)acrylate, n-propyl (meth)acrylate, and n-butyl (meth)acrylate. Ethyl (meth)acrylate and n-butyl (meth)acrylate are preferably used. They may also be used either independently or in combination.

The (meth)acrylate monomer mixture (component (A)) comprising the above components (A-1) and (A-2) is an essential component for providing durability to the emulsion to be obtained. The amount of component (A) to be incorporated to the total monomer components is 10 to 70 parts by weight, preferably 15 to 65 parts by weight, and more preferably 20 to 60 parts by weight. An amount of less than 10 parts by weight or greater than 70 parts by weight is undesirable because the durability of the product is low.

The ratio by weight of component (A-1) and component (A-2), which are the constituents of component (A), is 20-80/80-20, preferably 30-70/70-30, and more preferably 40-60/60-40, in component (A). The ratio outside this range gives only insufficient durability.

Given as examples of ethylenically unsaturated carboxylic acid monomers, which is component (B), are itaconic acid, (meth)acrylic acid, fumaric acid, maleic acid, crotonic acid, and 2-methacryloyloxyethylhexahydrophthalic acid. A preferable example among them is (meth)acrylic acid. These compounds may be used independently or in combination of two or more of them.

The aforementioned component (B) is an essential component which provides the aqueous coating composition with an alkali removing characteristic and durability.

A proportion of component (B) in the total monomer components is 5 to 30 parts by weight, preferably 8 to 30 parts by weight, and more preferably 10 to 25 parts by weight. An amount of less than 5 parts by weight is undesirable because the durability of the product is low, while an amount of greater than 30 parts by weight results in a low leveling characteristic of the aqueous coating composition product.

Component (C) of the present invention is a monomer which can copolymerize with components (A) and (B). Given as examples of component (C) are alkyl (meth)acrylates having an alkyl group with one carbon atom, e.g., methyl acrylate, methyl methacrylate; alkyl (meth)acrylates having an alkyl group with 6 or more carbon atoms, e.g., 2-ethylhexyl acrylate; hydroxyalkyl (meth)acrylates such as 2-hydroxyethyl (meth)acrylate and 2-hydroxypropyl (meth)acrylate; vinyl cyanides such as acrylonitrile and methacrylonitrile; amides such as acrylamide, methacrylamide, and N-methylolacrylamide; acrylic esters having an aromatic group, such as benzyl (meth)acrylate, phenoxyethyl (meth)acrylate, alkylphenoxyathyl (meth)acrylate, phenoxydiethylene glycol (meth)acrylate, phenoxypolyethylene glycol (meth)acrylate, alkylphenolethylene oxide (meth)acrylate, alkylphenolpropylene oxide (meth)acrylate, and 2-hydroxy-3phenoxypropyl (meth)acrylate, preferably phenoxyethyl (meth)acrylate and benzyl (meth)acrylate; aromatic vinyl compounds such as styrene, a-methylstyrene, 4-methylstyrene, 2-methylstyrene, 3-methylstyrene, 4-methoxystyrene, 2hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene, 1-vinylnaphthalene, and divinylbenzene, preferably styrene.

Other compounds useful as component (C) include epoxy compounds, polyfunctional (meth)acrylates, acid amide compounds, vinyl compounds, fluorine-containing compounds, silicone compounds, aminoalkyl esters of ethylenically unsaturated carboxylic acid, aminoalkyl amides, and the like.

Component (C) is incorporated in an amount of 0 to 85 parts by weight of the total monomer compounds. If the amount is greater than 85% by weight, the durability of the product is low.

The aqueous copolymer latex used in the present invention can be prepared by polymerizing the aforementioned monomer components (components (A)-(C)) in a conventional emulsion copolymerization method.

For example, components (A), (B), and (C), in a total amount of 100 parts by weight, an emulsifier, a polymerization initiator, a chain transfer agent, a chelating agent, a pH modifier, and the like are added to an aqueous medium, and a polymerization reaction of the liquid mixture is carried out at a temperature of 0-100° C. for 1-30 hours to prepare the aqueous copolymer latex.

As an emulsifier, an anionic, nonionic, or anionic-nonionic emulsifying agent, or, as the case may be, an amphoteric or cationic emulsifying agent, can be used.

Examples of anionic emulsifiers include sodium higher alcohol sulfates, sodium alkylbenzenesulfonates, sodium dialkyl succinic acid sulfonates, and sodium alkyl-diphenyl ether disulfonates. Of these, preferable anionic emulsifiers are sodium dodecylbenzenesulfonate, sodium lauryl sulfate, and sulfate of polyoxyethylene alkyl (or alkylphenyl) ether.

As examples of nonionic emulsifiers, polyoxyethylene alkylaryl ether can be given. Usually, polyoxyethylene nonylphenyl ether, polyoxyethylene octylphenyl ether, or the like is used as a nonionic emulsifier.

Lauryl betaine is given as an example of preferable amphoteric emulsifier.

As a cationic emulsifier, alkylpyridinyl chlorides, alkylammonium chlorides, or the like can be used.

Furthermore, a reactive emulsifier which can copolymerize with the monomers which are the constituents of the aforementioned monomer components (components (A)-(C)) can be used as an emulsifier in the preparation of aqueous copolymer latexes of the present invention. Examples of such reactive emulsifiers are sodium styrene sulfonate, sodium allylalkyl sulfonates, alkylallyl sulfosuccinates, polyoxyethylene alkylallyl glycerine ether sulfates, polyoxyethylene alkylphenol allyglycerine ether sulfates, and the like.

A water-soluble high molecular weight compound may also be used as an emulsifier. Given as examples of the water soluble high molecular compounds are polyvinyl alcohols, polyacrylates, water-soluble (meth)acrylate copolymers, salts of styrene-maleic acid copolymers, salts of styrene(meth)acrylic acid copolymers, copolymers of poly(meth)acryl amide, and copolymers of poly(meth)acryl amide. Of these, preferable water-soluble high molecular weight compounds are partially saponified polyvinyl alcohols, water-soluble (meth)acrylate copolymers, salts of carboxylated aromatic vinyl copolymer, e.g., salts of styrene-maleic acid copolymer, salts of styrene-(meth)acrylic acid copolymer; and the like.

As a aforementioned polymerization initiator, for example, water-soluble persulfates and hydrogen peroxide, preferably ammonium, sodium, or potassium persulfate, can be used, and, as the case may be, these compounds may be used in combination with a reducing agent.

Given as examples of reducing agents are sodium pylobisulfite, sodium hydrogensulfite, sodium thiosulfate, L-ascorbic acid and salts thereof, sodium formaldehyde sulfoxylate, and the like.

In addition, an oil soluble polymerization initiator such as, for example, 2,2'-azobis-isobutyronitrile, 2,2'-azobis (4-methody-2,4-dimethylvaleronitrile), 2,2'-azobis-2,4-dimethylvaleronitrile, 1,1'-azobis- cyclohexane-1-carbonitrile, benzoyl peroxide, dibutyl peroxide, and cumene hydroperoxide, or the like, may be used dissolved in the monomer or the medium. Preferable oil soluble polymerization initiators are cumen hydroperoxide, isopropylbenzene hydroperoxide, paramenthane hydroperoxide, azobisisobutyronitrile, benzoyl peroxide, tert-butyl hydroperoxide, 3,5,5-trimethylhexanol peroxide, and tertbutylperoxy(2-ethylhexanoate).

About 0.1 to 3 parts by weight of such a copolymerization initiator is used for 100 parts of the monomers (components (A)-(C)).

Given as examples of aforementioned chain transfer agents are halogenated hydrocarbons, e.g., chloroform, bromoform; mercaptans, e.g., n-dodecyl mercaptan, tertdodecyl mercaptan, n-octyl mercaptan; xanthogenic compounds, e.g., dimethylxanthogen disulfide, diisopropylxanthogen disulfide; terpenes, e.g., dipentene, terpinolene; a-methylstyrene dimers (those consisting of at least one of 2,4-diphenyl-4-methyl-1-pentene (al), 2-4-diphenyl-4methylphenylpentene ($a_2$), and 1-1-3-trimethyl-3-phenylindane ($a_3$), and preferably those with the ratio by weight of ($a_{1pl}$)/($a_2$) and/or ($a_3$) being 40-100/0-60); unsaturated cyclic hydrocarbons, e.g., 9,10-dihydroanthracene, 1,4dihydronaphthalene, indene, and 1,4-cyclohexadiene; unsaturated heterocyclic compounds, e.g., xanthene and 2,5dihydrofuran; and octyl thioglycolate, preferably a-methylstyrene dimer and the like.

The chain transfer agent is added in an amount of approximately 0 to 5 parts by weight per 100 parts of the monomers (components (A)–(C)).

Examples of aforementioned chelating agents are glycine, alanine, ammonium carbonate, ethylenediamine tetraacetate, preferably ammonium carbonate. As a pH modifier, sodium carbonate, potassium carbonate, sodium bicarbonate, ammonia, preferably ammonia, can be used.

The chelating agent and the pH modifier are compounded in an amount of approximately 0 to 0.1 and 0 to 3 parts by weight, respectively, per 100 parts of the monomers.

A small amount of a solvent; e.g., methyl ethyl ketone, acetone, trichlorotrifluoroethane, methyl isobutyl ketone, dimethyl sulfoxide, toluene, dibutyl phthalate, methylpyrrolidone, ethyl acetate, alcohols, cellosolves, and carbitols, may be used in the emulsion polymerization, as required. They are used within a limit not damaging the processability, working and environmental safety, and security of manufacturing. Alcohols and carbitols are preferable solvents.

The amount of solvent used is approximately 0 to 10 parts by weight per 100 parts of the monomers (components (A)–(C)).

The emulsion polymerization in the present invention may be carried out according to a conventional method, for example, a method in which all monomers are fed to a reaction system at one time, a method in which after reacting a part of monomers the remaining monomers are fed successively or separately, and a method in which each monomer is continuously fed. In any method, it is desirable to keep the rate of polymerization in the course of the reaction over 85%, preferably over 90%, from the aspect of improving the durability and glossiness of the product. The final polymerization conversion rate of copolymers in the polymerization reaction is preferably 90 to 100% by weight, and particularly preferably 95 to 100% by weight.

In the case where the seed polymerization method is used, an advisable method is preparing seed particles of copolymers in advance by the emulsion copolymerization of monomers, and then adding a mixture of the monomers consisting of components (A)–(C) to the seed particles for the emulsion copolymerization.

A weight average molecular weight of the copolymer obtained by the emulsion copolymerization is preferably 100,000 to 1,000,000, and more preferably 100,000 to 500,000. If the value of the average molecular weight is less than 100,000, the durability of the product is low, while if it is over 1,000,000, the leveling characteristic of the product is insufficient.

A glass-transition temperature ($T_g$) of the copolymer is 20° C. to 80° C., preferably 30° C. to 70° C., and more preferably 35° C. to 65° C. If the glass-transition temperature is lower than 20° C., the durability of the product is low, while if it is higher than 80° C., the film-forming capability of the product is not satisfied.

An average particle diameter of the copolymer is 300 to 2,000 angstroms, preferably 600 to 1,500 angstroms, and more preferably 700 to 1,200 angstroms. If the average particle diameter is less than 300 angstroms, the leveling characteristic of the product is insufficient, while if it is over 2,000 angstroms, the required durability and resistance to neutralization of the product is not sufficient.

An alkoxysilane compound may be added to the aqueous copolymer latex of the present invention after the preparation, as required.

Given as examples of alkoxysilane compounds are tetramethoxysilane, tetraethoxysilane, tetrapropoxysilane, tetrabutoxysilane, methyltrimethoxysilane, methyltriethoxysilane, ethyltrimethoxysilane, ethyltriethoxysilane, npropyltrimethoxysilane, n-propyltriethoxysilane, isopropyltrimethoxysilane, isopropyltriethoxysilane, γ-chloropropyltrimethoxysilane, γ-chloropropyltriethoxysilane, vinyltrimethoxysilane, vinyltriethoxysilane, 3,3,3trifluoropropyltrimethoxysilane, 3,3,3-trifluoropropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, γ-mercaptopropyltrimethoxysilane, γ-mercaptopropyltriethoxysilane, phenyltrimethoxysilane, phenyltriethoxysilane, γ-aminopropyltrimethoxysilane, 3,4-epoxycyclohexylethyltrimethoxysilane, 3,4-epoxycyclohexylethyltriethoxysilane, dimethyldimethoxysilane, dimethyldiethoxysilane, and diethyldimethoxysilane.

It is preferable to use tetramethoxysilane, tetraethoxysilane, methyltrimethoxysilane, methyltriethoxysilane, dimethyldiethoxysilane, or the like.

These alkoxysilane compounds may be used independently or in combination of two or more of them. The amount of the alkoxy compound to be added to the composition of the present invention is preferably 0.1 to 10% by weight of the total amount of the composition.

The aqueous coating composition of the present invention includes the aforementioned copolymer latex in an amount of 15 to 40% by weight, and preferably 18 to 30% by weight, as converted into solid.

The aqueous coating composition of the present invention can be provided with the optimum characteristics by adding a wax emulsion, an alkali soluble resin, a polyvalent metal salt, a film-forming agent, a lubricant, a dispersant, a leveling agent, an antiseptic, an antifoaming agent, and the like depending on use.

For example, an aqueous coating composition of the present invention to be used as a floor polishing composition requires the addition of a film-forming agent, e.g., ethyl carbitol, methyl carbitol; a wetting agent, e.g., fluorine-containing surfactant, sodium dioctyl sulfosuccinate; and a wax, e.g., polyethylene resin, polypropylene resin, carboxy modified polyethylene resin. An amount to be incorporated in the floor polishing composition of a film-forming agent is 5 to 50 parts by weight, preferably 10 to 40 parts by weight; of wetting agent is 0.01 to 0.5 parts by weight, preferably 0.05 to 0.3 parts by weight; and of a wax is 0 to 50 parts by weight, preferably 10 to 30 parts by weight; each for 100 parts by weight of solid components of the latex.

Such a floor polishing composition is further supplemented by an alkali soluble agent, e.g., a styrenemaleic acid copolymer; a polyvalent metal salt, e.g, zinc ammonium carbonate; a dispersant, e.g., polyoxyethylene alkylphenol; a leveling agent, e.g., tributoxydiethyl phosphate; and the like.

Other features of the invention will become apparent in the course of the following description of the exemplary embodiments which are given for illustration of the invention and are not intended to be limiting thereof.

EXAMPLES

Examples 1-6, Comparative Examples 1-8

(1) A reaction vessel (capacity; 3 litters) made of glass equipped with a stirrer was fitted with a condenser, a thermometer, and a dropping funnel. 100 parts by weight of deionized water, 1 part by weight of sodium lauryl sulfate, and 0.5 part by weight of ammonium persulfate were charged into the reaction vessel. After replacing the internal air in the vessel with nitrogen, the internal temperature was raised to 65° C. under stirring to dissolve the mixture.

An emulsion mixture, which had been prepared in advance by mixing 50 parts by weight of deionized water, 1 part by weight of sodium lauryl sulfate, and monomers listed in Tables 1-2 with stirring in another vessel, was continuously added dropwise to the above mixture over 3 hours and reacted at a temperature of 80° C. while introducing nitrogen into the vessel. After the dropping, the resulting mixture was stirred at 85° C. for a further 2 hours, followed by cooling to 25° C., to complete the reaction.

The polymerization conversion rate of copolymer latexes A-N shown in Tables 1-2 was above 98% by weight. No production of coagulated matters was found.

PREPARATION OF AQUEOUS COATING COMPOSITIONS

Aqueous coating compositions for flooring of the following formulation were prepared.

|  | % by weight |
| --- | --- |
| Copolymer latex (*1) | 85 |
| Alkali soluble resin (*2) | 4.5 |
| Fluorine-containing surfactant (*3) | 0.5 |
| Wax (*4) | 10 |

(*1): Prepared by adding a film-forming agent (a mixture of 1 part by weight of tributoxyethyl phosphate and 4 parts by weight of ethyl carbitol) to 100 parts by weight of each of aqueous copolymer latexes A-N to adjust the lowest film-forming temperature to 5° C. and by further adding deionized water to adjust the solid content to 20% by weight.
(*2): alkali soluble resin: SMA-2625A produced by ARCO Chemical Company (styrene-maleic acid resin with an acid value of 220 and a molecular weight of 1,900); the solid content was adjusted to 15% by weight.
(*3): A fluorine-containing surfactant $C_8F_{17}SO_2N(C_2H_5)CH_2COOK$; the solid content was adjusted to 1% by weight.
(*4): A 20 wt % solution of E-4B (manufactured by Toho Chemical Industries, Ltd.)

The characteristics of the aqueous coating compositions were evaluated according to the following methods.

(1) NEUTRALIZATION TEST

Cement mortar was prepared according to JIS A 1171.1. The cement mortar was formed into a cube of a size of 10 cm × 10cm × 10cm using a mold, cured at a temperature of 20 ± 2° C. under a humidity of over 80% for two days, and then released from the mold. The released cement mortar was cured at a temperature of 20 ± 2° C. in water for 5 days and further at a temperature 20 ± 2° C. under a humidity of 60 ± 10% for 21 days. The aqueous coating composition was applied to the diagonal surfaces (only two surfaces) of the treated cement mortar using a brush to form a coverage of the coating composition of 300 g/cm². After 24 hours, the subject cement mortar was placed in a neutralization test vessel (carbon dioxide atmosphere) and allowed to stand at a temperature of 30° C. under a humidity of 60% and a carbon dioxide atmosphere ($CO_2$ concentration: 20%) for 7 days.

Then, the subject cement mortar was split into two parts. The sectional surface of the part of the cement mortar was sprayed with an alcohol solution containing 1% of phenolphthalein. The area of which the surface did not change into red was measured as a neutralized area. The larger the neutralized area, the higher is a degree of neutralization and the worse is the characteristic of the aqueous coating composition.

(2) Durability

The aqueous coating composition was applied to tiles of polyvinyl chloride to form a coverage of 10 g/m² and dried. This treatment was repeated three times to prepare sample tiles. The samples were placed in a pavement on a busy street to observe degrees of damages and soiling of the tile after 7 days.

<Evaluation>

AAA: Very little or no damages and soiling were found.
BBB: A little damage and soiling were found.
CCC: A large damage and soiling were found.

(3) LEVELING CHARACTERISTIC

The aqueous coating composition was applied to a tile of polyvinyl chloride to form a coverage of 10 g/m². Immediately after that a pair of diagonal like character X were drawn and dried. This procedure was repeated three times to prepare a sample. After the sample was dried, a degree of disappearance of the diagonals was observed to determine the leveling characteristic of the aqueous coating composition.

<Evaluation>

AAA: the diagonals were almost disappeared
BBB: the diagonals remained a little
CCC: the diagonals almost remained The aqueous coating compositions prepared from the aqueous copolymer latexes A-N obtained in Examples and Comparative Examples were evaluated. The results are shown in Tables 1 and 2.

TABLE 1

|  | Examples | | | | | |
| --- | --- | --- | --- | --- | --- | --- |
|  | 1 | 2 | 3 | 4 | 5 | 6 |
| Copolymer dispersed in a composition for flooring | A | B | C | L | M | N |
| Monomer (parts by weight) | | | | | | |
| t-Butyl methacrylate | 10 | 2 |  | 15 | 10 | 10 |
| i-Butyl acrylate | 10 | 15 | 20 |  | 10 | 10 |
| Ethyl acrylate | 10 | 15 | 10 | 15 | 10 | 10 |
| n-Butyl acrylate | 10 | 3 |  |  | 10 | 10 |
| Acrylic acid | 2 | 0.5 |  | 2 | 2 | 2 |
| Methacrylic acid | 18 | 18.5 | 19 | 18 | 18 | 18 |
| Fumaric acid |  | 1 |  |  |  |  |
| Styrene | 20 | 30 | 40 | 20 | 20 | 20 |

TABLE 1-continued

| | Examples | | | | | |
|---|---|---|---|---|---|---|
| | 1 | 2 | 3 | 4 | 5 | 6 |
| Methyl methacrylate | 10 | 15 | 11 | 30 | 10 | 10 |
| Benzyl methacrylate | 10 | | | 10 | 10 | |
| 2-Ethylhexyl acrylate | | | | | | |
| Tg (°C.) | 56 | 60 | 66 | 90 | 56 | 56 |
| Particle diameter (angstrom) | 900 | 880 | 950 | 900 | 270 | 2800 |
| Result of evaluation | | | | | | |
| Neutralization (cm$^2$) | 2.2 | 2.0 | 1.8 | 6.6 | 2.2 | 5.3 |
| Durability | AAA | AAA | AAA | BBB | BBB-AAA | BBB |
| Leveling characteristic | AAA | AAA | AAA | AAA | BBB | AAA |

TABLE 2

| | Comparative Examples | | | | | | | |
|---|---|---|---|---|---|---|---|---|
| | 1 | 2 | 3 | 4 | 5 | 6 | 7 | 8 |
| Copolymer dispersed in a composition for flooring | D | E | F | G | H | I | J | K |
| Monomer (parts by weight) | | | | | | | | |
| t-Butyl methacrylate | 2 | 10 | | 30 | 10 | 10 | 2 | |
| i-Butyl acrylate | 3 | 25 | 5 | 5 | 10 | 10 | 2 | |
| Ethyl acrylate | 10 | 2 | | 30 | 10 | 10 | 2 | 30 |
| n-Butyl acrylate | 25 | 3 | 3 | 10 | 10 | 10 | 2 | |
| Acrylic acid | 2 | 2 | 2 | 2 | 1 | 5 | 6 | 19 |
| Methacrylic acid | 18 | 18 | 18 | 18 | 2 | 28 | 5 | |
| Fumaric acid | | | | | | 1 | | |
| Styrene | 20 | 20 | 20 | 5 | 20 | 20 | 29 | 40 |
| Methyl methacrylate | 10 | 10 | 37 | | 27 | 6 | 36 | 11 |
| Benzyl methacrylate | 10 | 10 | | | 10 | | | |
| 2-Ethylhexyl acrylate | | | 15 | | | | 22 | |
| Tg (°C.) | 36 | 60 | 60 | 40 | 45 | 68 | 37 | 66 |
| Particle diameter (angstrom) | 890 | 920 | 1000 | 950 | 890 | 980 | 1000 | 980 |
| Result of evaluation | | | | | | | | |
| Neutralization (cm$^2$) | 2.1 | 2.0 | 2.0 | 2.4 | 2.0 | 8.4 | 2.3 | 2.3 |
| Durability | BBB-CCC | BBB | BBB | BBB-CCC | BBB-CCC | BBB-AAA | BBB | BBB |
| Leveling characteristic | AAA | AAA | AAA | AAA | AAA | CCC | AAA | CCC |

Aqueous copolymer latexes A–C and L–N are those prepared according to the present invention, while aqueous copolymer latexes D–K are those outside the scope of the present invention.

Examples 1–6 are preferred embodiments of aqueous coating compositions of the present invention. The coating compositions prepared in these examples were superior in all of the resistance to neutralization, the durability, and the leveling characteristic.

Comparative Example 1 is an example in which component (A-1) was deficiently incorporated to prepare the aqueous coating composition. The aqueous coating composition obtained was inferior in the durability.

Comparative Example 2 is an example in which component (A-2) was deficiently incorporated to prepare the aqueous coating composition. The aqueous coating composition obtained was inferior in the durability.

Comparative Example 3 is an example in which (A) component was deficently incorporated outside the range according to the present invention to prepare the aqueous coating composition. The aqueous coating composition obtained was inferior in the durability.

Comparative Example 4 is an example in which the amount of component (A) was excessive outside the range according to the present invention to prepare the aqueous coating composition. The aqueous coating composition obtained was inferior in the durability and the glossiness.

Comparative Example 5 is an example in which component (B) was deficently incorporated outside the range according to the present invention to prepare the aqueous coating composition. The aqueous coating composition obtained was inferior in the durability.

Comparative Example 6 is an example in which component (B) was excessively incorporated outside the range according to the present invention to prepare the aqueous coating composition. The aqueous coating composition obtained was inferior in the resistance to neutralization and in the leveling characteristic.

Comparative Example 7 is an example in which the amount of component (C) was excessive and out of the range according to the present invention to prepare an aqueous coating composition. The aqueous coating composition obtained was inferior in the durability.

Comparative Example 8 is an example in which no branched alkyl (meth)acrylate was used as component (A) to prepare the aqueous coating composition. The aqueous coating composition obtained was inferior in the durability and the leveling characteristic.

The aqueous coating composition of the present invention exhibits strong resistance to neutralization, excellent durability, a superior leveling characteristic, superb adhesiveness, high resistance to water-permeation, and good water repellency. Thus it is suitable for coating plastics, ceramics, woods, formed concrete, and the like.

Obviously, numerous modifications and variations of the present invention are possible in light of the above teachings. It is therefore to be understood that within the scope of the appended claims, the invention may be

What is claimed is:

1. A aqueous coating composition comprising 15 to 40% (as a solid) by weight of an aqueous copolymer latex prepared by the emulsion polymerization of monomer components which comprises:
    (A) 10 to 70 parts by weight of a (meth)acrylate monomer comprising (A-1) 20 to 80% by weight of a branched $C_{3-5}$-alkyl (meth)acrylate and (A-2) 80 to 20% by weight of a linear $C_{2-4}$ alkyl (meth)acrylate;
    (B) 10 to 25 parts by weight of an ethylenically unsaturated carboxylic acid; and
    (C) 0 to 85 parts by weight of at least one monomer copolymerizable with said components (A) and (B) selected from the group consisting of aromatic vinyl compounds, (meth)acrylic acid esters having 1 carbon atom, (meth)acrylic acid esters having 6 or more carbon atoms, and (meth)acrylic acids having an aromatic group.

2. The aqueous coating composition according to claim 1, wherein said component (A-1) is at least one compound selected from the group consisting of isobutyl acrylate, isobutyl methacrylate, tert-butyl acrylate, and tert-butyl methacrylate.

3. The aqueous coating composition according to claim 1, wherein said component (A-2) is at least one compound selected from the group consisting of ethyl acrylate, ethyl methacrylate, n-butyl acrylate, and n-butyl methacrylate.

4. The aqueous coating composition according to claim 1, wherein said component (B) is at least one compound selected from the group consisting of methacrylic acid and acrylic acid.

5. The aqueous coating composition according to claim 1, wherein said component (A) comprises 30 to 70% by weight of said component (A-1) and 70 to 30% by weight of said component (A-2).

6. The aqueous coating composition accoarding to claim 1, wherein said component (A) comprises 40 to 60% by weight of said component (A-1) and 60 to 40% by weight of said component (A-2).

7. The aqueous coating composition according to claim 1, wherein the amount of said components (A), (B), and (C) are 15 to 65 parts by weight, 10 to 25 parts by weight, and 5 to 73 parts by weight, respectively, with the total amount of components (A), (B), and (C) being 100 parts by weight.

8. The aqueous coating composition according to claim 1, further comprising, for 100 parts by weight of solid components of latex, 5 to 50 parts by weight of a film-forming agent, 0.01 to 0.5 parts by weight of a wetting agent, and 0 to 50 parts by weight of a wax.

* * * * *